Dec. 20, 1966  D. E. HARTMANN  3,292,770

CONVEYOR SYSTEM FOR COLLECTING EGGS

Filed Dec. 28, 1964  3 Sheets-Sheet 1

INVENTOR.
DAVID E. HARTMANN
BY Herbert E. Kidder
AGENT

Dec. 20, 1966    D. E. HARTMANN    3,292,770
CONVEYOR SYSTEM FOR COLLECTING EGGS
Filed Dec. 28, 1964    3 Sheets-Sheet 2
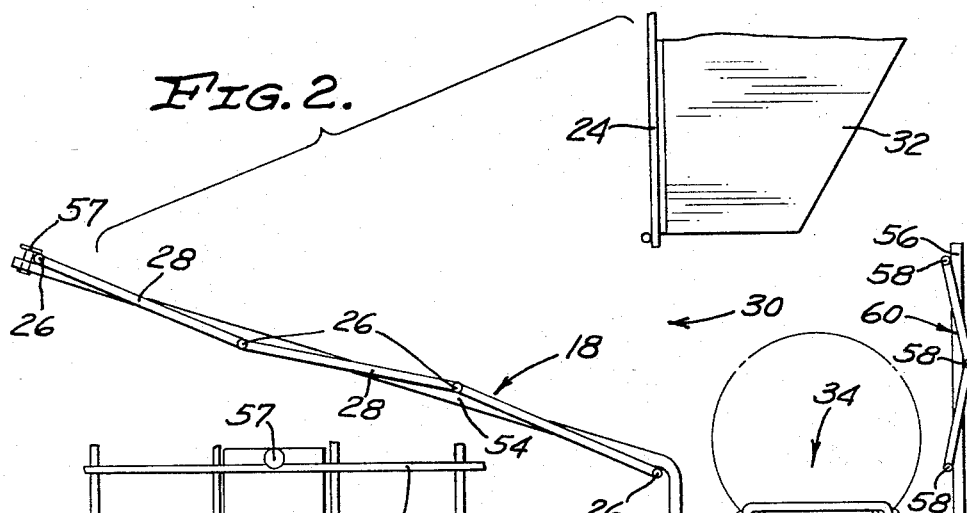
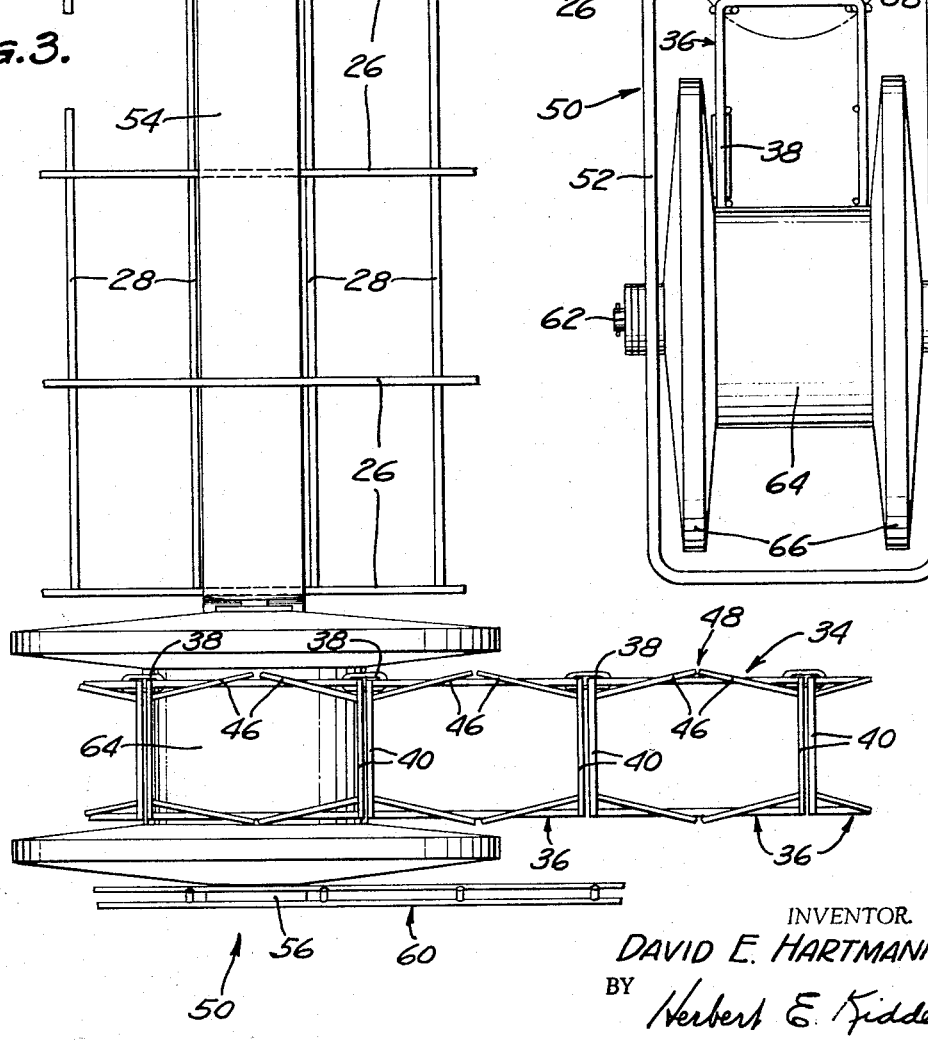
INVENTOR.
DAVID E. HARTMANN
BY Herbert E. Kidder
AGENT Dec. 20, 1966  D. E. HARTMANN  3,292,770
CONVEYOR SYSTEM FOR COLLECTING EGGS
Filed Dec. 28, 1964  3 Sheets-Sheet 3
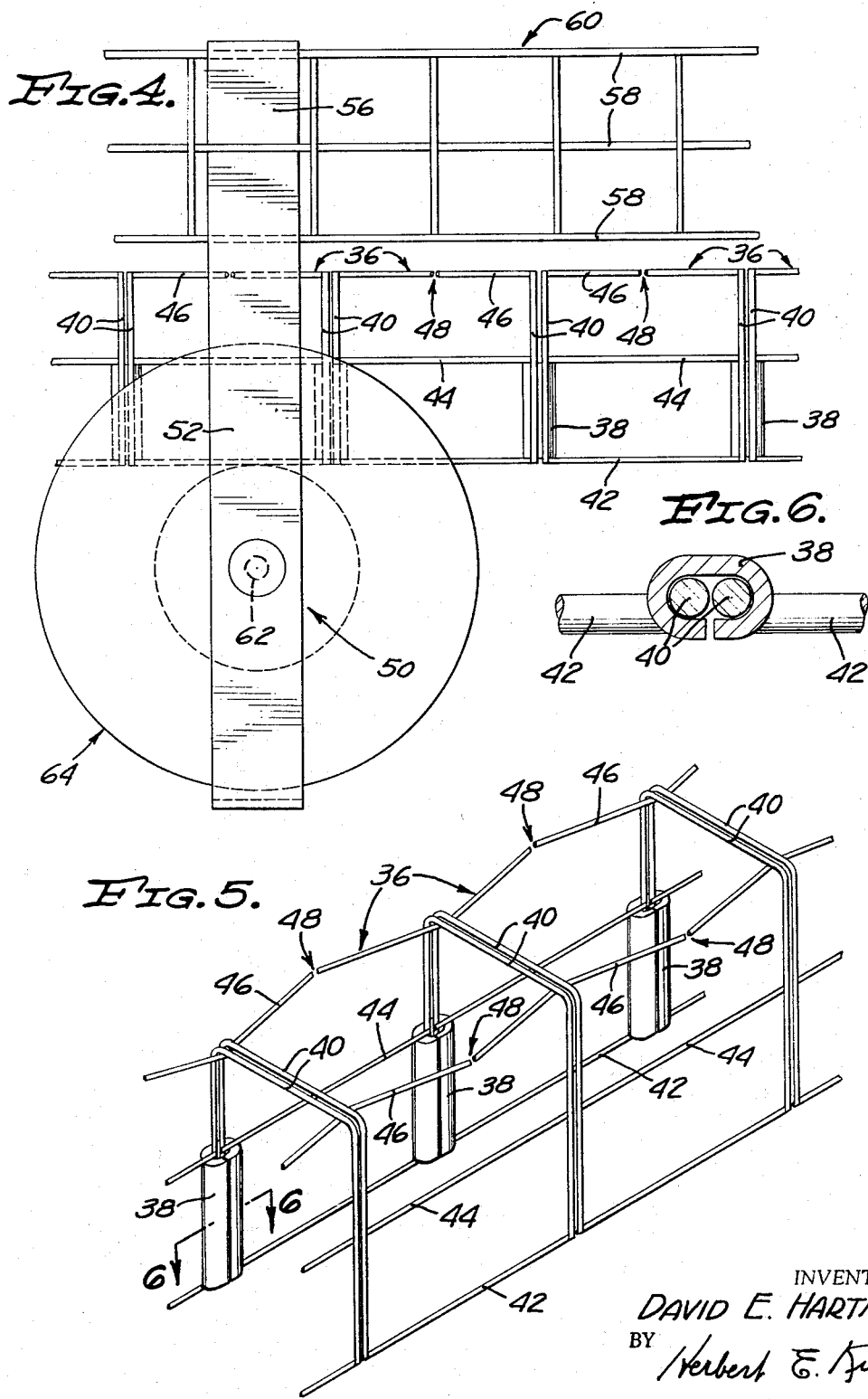
INVENTOR.
DAVID E. HARTMANN
BY Herbert E. Kidder
AGENT

United States Patent Office 3,292,770
Patented Dec. 20, 1966

3,292,770
CONVEYOR SYSTEM FOR COLLECTING EGGS
David E. Hartmann, 3355 Columbia Ave.,
Riverside, Calif. 92501
Filed Dec. 28, 1964, Ser. No. 421,374
11 Claims. (Cl. 198—131)

The present invention relates generally to conveyor systems for transporting delicate articles that cannot withstand rough handling or bumping against one another, and more particularly, to an egg collecting system for use on egg ranches of the type wherein laying hens are confined, either singly or in small groups, in laying cages that are arranged in long rows. While the invention is primarily designed for conveying eggs, it is also adapted for use in transporting other articles that are delicate and require careful handling.

The primary object of the invention is to provide a new and improved form of conveyor system for collecting eggs from the laying cages and transporting them to a common collecting point, where they may be further processed and packed.

One of the important objects of the invention is to provide a conveyor system that is efficient and economical in operation, and at the same time, simple and inexpensive to manufacture and install.

Another important object of the invention is to provide a conveyor system that handles the eggs gently and keeps them clean. In this connection, one feature of the invention is that each egg is carried by an individual cradle, or basket, which holds it securely and separate from the others, so that the eggs cannot bump into one another, or roll or fall off the conveyor. It is extremely important that the eggs be prevented from bumping into one another while being transported, as any jarring or bumping is deleterious to the quality of the egg, and may cause minute cracks in the shell, or other defects, that downgrade the egg from top quality to a considerably lower grade. Another feature of the invention is that the conveyor chain is open at the bottom, so that broken eggs will fall through to the ground and will not mess up the conveyor.

A further object of the invention is to provide an egg conveyor system that can be installed on existing batteries of laying cages, without requiring a separate supporting structure of its own. This object is accomplished by means of a novel conveyor chain which is quite flexible in the horizontal plane, so that it passes freely around sprocket wheels at the ends of the rows of cages, yet at the same time is quite rigid in the vertical plane, so that it is self-supporting over a considerable span. This novel conveyor chain is then carried by supporting roller brackets spaced along the length of the conveyor, each of which is detachably secured to the adjacent cage by means of a tang that is threaded through the welded wire of the cage bottom. One great advantage of this system is that no continuous supporting structure is required under the conveyor chain, as is the case with belts and other conveyor chains which are flexible in the vertical plane. Such supporting structure is expensive, and in large egg ranches where the lines of laying cages may extend for hundreds of feet, the cost of the conveyor system may become a large item.

Another object of the invention is to provide an egg conveyor system that is quickly and easily cleaned or repaired; durable; long-lasting; and efficient in the respect that virtually the entire length of the conveyor chain is disposed in a functional capacity to receive eggs as they roll down the inclined cage bottoms of the laying cages. There is no idle "return" course of the conveyor chain, and the entire length of chain, with the exception of the small portion traveling around sprocket wheels at the ends of the rows, is disposed in front of the cages in readiness to receive the just-laid eggs.

The foregoing objects are achieved in the present invention by means of a conveyor chain of novel design, consisting of a plurality of rectangular, box-like links, or cages, made up of welded wire, which are joined together end-to-end by hinge barrels. The two side wires at the top of each link are bent outwardly at the middle, so as to form a pair of side rails that conform generally to the contour of the egg and provide two widely spaced lines of support for the egg, whereby the latter is securely yet gently cradled by the cage and is prevented from rolling around or bumping against other eggs as it travels along the length of the conveyor. The ends of the adjoining cages abut against one another, and are joined together along one side by hinge barrels, whereby the cages brace one another to prevent any appreciable sag in the conveyor chain between spaced-apart supports. The conveyor chain is supported at intervals by roller brackets, each of which has a first tang that extends parallel to the cage bottom and is woven through the welded wires of which the cage bottom is made, and a second tang. The latter extends vertically upward from the conveyor chain on the side opposite the cages, and is woven through the horizontal wires of a narrow strip of welded wire, which forms a fence, or back-stop, to prevent the eggs from falling off the conveyor chain when they roll down the inclined cage bottom onto the conveyor, or as they travel along the latter. All wires which contact the eggs may be coated with plastic or rubber to provide additional cushioning and to improve the appearance of the apparatus.

In the preferred form of the invention, the conveyor chain passes up one side of a double row of laying cages, which are arranged back-to-back, and returns along the other side. At each end of the double row of cages, the conveyor chain passes around one or more sprocket wheels. The eggs are removed from the conveyor chain at a common collecting station by means of a sweep, which gently pushes the eggs off the chain as they move by, or the eggs may be transferred to a cross-conveyor, which carries them directly into a washer or other processing apparatus.

The invention also contemplates another mode of operation of the conveyor, which might be utilized in the cross-conveyor mentioned above, or other application, where it might be desirable to have the conveyor flexible in the vertical plane, and relatively rigid in the horizontal plane. In this case, the cages, or links, would be connected together by horizontal hinge barrels, which encircle parallel, horizontal wires at the bottom of adjacent cages. Moreover, each link in the conveyor chain could consist of several cages disposed side-by-side, to provide as wide a conveyor as desired. The chain would then pass around vertical sprockets at each end of the conveyor, and would return empty on the bottom side. Each row of egg-collecting conveyors could then deliver its eggs to one specific row of cages on the cross-conveyor, thereby giving each egg an individual basket on the cross-conveyor, which would insure that each egg would be separated from all the other eggs on the conveyor, and would be prevented from bumping into the others. Inasmuch as this unique conveyor chain can be made economically in various sizes and shapes; it can be made rigid in either the vertical or horizontal plane; it can be made in various widths by using side-by-side cages; and it has the desirable characteristic of transporting articles in a manner whereby they are prevented from bumping against one another, or otherwise rolling around on the conveyor, the invention has a multitude of applications in addition to collecting eggs.

Other objects and advantages of the present invention will become apparent to those skilled in the art upon consideration of the following detailed description of the preferred embodiment thereof, reference being had to the accompanying drawings, wherein:

FIGURE 2 is an enlarged fragmentary sectional view of the same, taken at 2—2 in FIGURE 1;

FIGURE 3 is a view looking down onto the portion shown in FIGURE 2;

FIGURE 4 is a side elevational view of the portion shown in FIGURE 2;

FIGURE 5 is an isometric drawing of a short length of the conveyor chain;

FIGURE 6 is an enlarged fragmentary sectional view taken at 6—6 in FIGURE 5.

Figure 1:
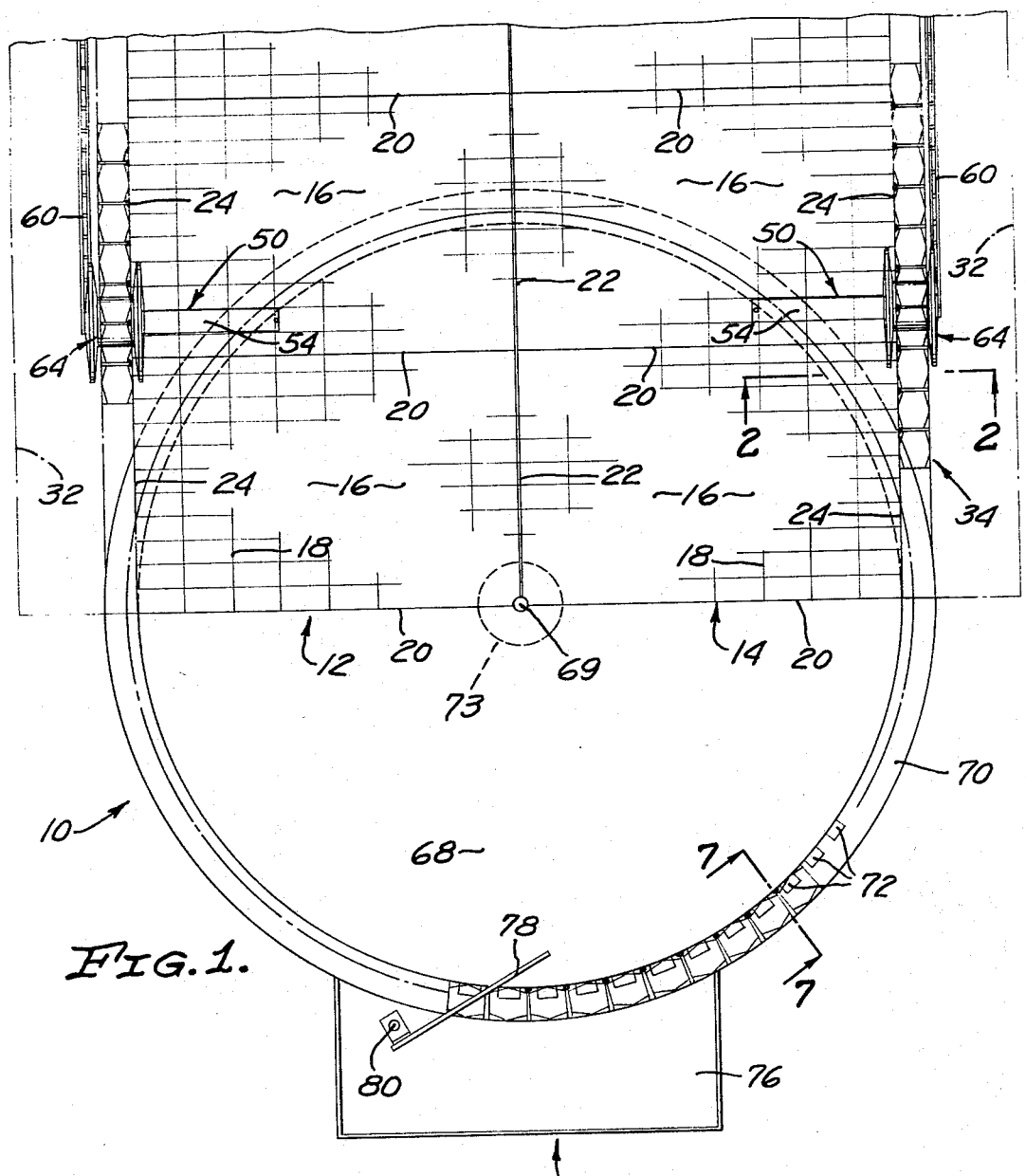
FIGURE 1 is a top plan view of one end of a conveyor system embodying the principles of the present invention.
Figure 7:
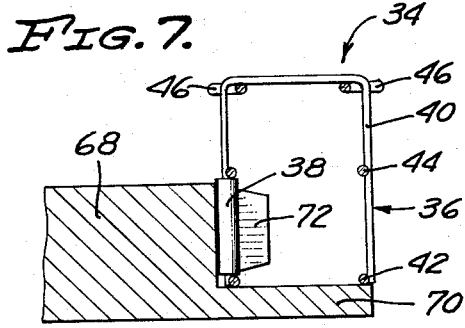
FIGURE 7 is an enlarged sectional view taken at 7—7 in FIGURE 1.

In the drawings, the conveyor system of the present invention is designated in its entirety by the reference numeral 10. The invention is used in combination with a double row of laying cages 12 and 14, which are arranged back-to-back in a line sometimes extending for 300 feet or more in length.

Each of the cages 16 is made of welded wire in the conventional manner, and consists of a bottom 18, sides 20, back end 22 and front end 24. The top of the cages is not shown. In most cases, the welded wire of which the cages are made consists of one set of wires 26 which are spaced about 2 inches apart from one another, and another set of wires 28 which are spaced about one inch apart from one another. In the cage bottoms, the wires 26 extend generally parallel to the longitudinal axis of the rows 12, 14, while the wires 28 extend transversely to the axis of the rows. The front ends 24 of the cages have discharge openings 30 provided therein under the feeding trough 32, and the just-laid eggs tend to roll down the inclined cage bottom, and through the discharge openings 30 as soon as they are released by the hen.

Extending along the front edges of the cages 16 immediately below the lower end of the inclined cage bottoms 18 and closely adjacent thereto is conveyor chain 34 made up of links 36 which are joined together by hinge barrels 38. Each of the links 36 has the general configuration of a rectangular box, and is made up of welded wire which is bent into the shape of an inverted channel. Each link consists of two longitudinally spaced end wires 40, each of which is bent into the shape of an inverted U, and joining these end wires are a bottom wire 42, middle wire 44, and top wires 46. The wires 42, 44, 46 extend horizontally, and are joined at their ends to the end wires 40. The wires 40–46 of which the links are made, are preferably covered with a skin of soft plastic, or rubber, which provides a cushioned surface that is also easy to keep clean.

As best shown in FIGURE 5, the top wires 46 are split at 48 and are bent outwardly at their mid-portions to conform generally to the configuration of an egg being carried by the chain link 36. Alternatively, the top wires 46 might be bent or molded to the shape shown, without cutting the wires. Since the average egg is practically elliptical in shape, the outwardly bent top wires 46 of the link provide a wide seat for the egg so that the latter is safely and securely held by the conveyor chain and will not be accidentally dislodged therefrom.

The conveyor chain 34 is supported at spaced intervals along its length by a plurality of supporting brackets 50, each of which is attached to the cages as will now be described. The bracket 50 consists of a U-shaped strap 52 of iron or the like, having a laterally projecting tang 54 on one side, and an upward extension 56 on the other side, which constitutes another tang. The tang 54 is parallel to the cage bottom 18, and is threaded over and under the longitudinal wires 26, as best shown in FIGURE 2. In this way, the bracket 50 is supported solely from the cage bottom, and requires no additional supporting structure. A rivet 57 is driven through a hole in the tang 54, and its head overlies one of the wires 26 to secure the tang against slipping.

The other tang 56 is woven under and over the horizontal wires of a narrow strip 60 of welded wire, which serves as a backstop fence along the outside of the conveyor chain to prevent eggs from falling off the outside of the conveyor chain when they come rolling down the inclined cage bottom and onto the conveyor chain.

Mounted between the sides of the U-shaped strap 52 is a horizontal shaft 62, upon which is journaled a roller 64. The roller 64 has side flanges 66 which extend up along opposite sides of the conveyor chain 34 to keep the latter in proper position.

At the end of the double row 12, 14 of cages, the conveyor chain 34 is carried around from one side of the row to the other on sprocket wheels 68, one of which is shown in FIGURE 1. The sprocket wheel 68 turns on a vertical shaft 69, and has a bottom flange 70 upon which the conveyor chain rests as it travels around. Sprocket teeth 72 project from the outer periphery of the wheel 68, and these sprocket teeth pass between the bottom wire 42 and middle wire 44 and engage the hinge barrels to drive the conveyor chain. The sprocket wheel 68 at one end of the row is driven by a motor 73 having an integral speed reduction gear box, which drives the conveyor chain at the desired rate of speed.

At one end of the row is a collection station 74, consisting of a table 76, or cross-conveyor (not shown). The table 76 is level with the top of the conveyor chain, and is shaped to conform to the sprocket wheel, as shown in FIGURE 1. An inclined sweep 78 is attached at 80 to the table 76, and extends diagonally across the conveyor chain so that it engages the eggs and gently lifts them off the conveyor chain onto the table as the chain moves by. The eggs are then collected from the table for further processing and/or packing.

The hinge barrels 38 which surround the end wires 40 between the bottom wire 42 and middle wire 44, permit free relative swinging movement of the links with respect to one another in the horizontal plane, but resist relative movement in the vertical plane. Thus, the conveyor chain is relatively stiff and self-supporting, and requires support only at spaced intervals along the row, preferably spaced between 18 and 36 inches apart.

An alternative embodiment contemplated by the invention would utilize horizontal hinge barrels surrounding parallel, horizontal wires extending across the bottom of the cages at each end thereof, similar to wires 40 at the top of the cages. In this case, the horizontal hinge barrels would provide flexibility in the vertical plane, and relative rigidity in the horizontal plane. This form of conveyor chain would pass around vertical sprockets, and the return flight would travel in the opposite direction to the top flight and directly below the latter.

One of the chief advantages of the invention is the ease with which the brackets 50 may be attached to the cage bottoms 18, without the necessity of building a supporting structure. By eliminating such supporting structure, the cost of the conveyor system is greatly reduced, and the advantages of mechanical egg collecting can be made available to egg ranchers who might otherwise be unable to afford the high cost of a more expensive conveyor.

The operation of the invention is believed to be self-evident from the foregoing description. Eggs rolling down the inclined cage bottoms come to rest on the tops of the conveyor links 36, where they are supported and cradled by the outwardly bowed top wires 46. These supporting wires have only three- or four-point contact with the eggs, and therefore there is little opportunity for the conveyor chain to soil the eggs. The open construction of the conveyor links allows broken eggs to drop through to the ground, without messing up the conveyor chain as is the case when an egg breaks on a conveyor belt. Moreover, the open construction of the conveyor chain lends itself to easy cleaning by means of a roller brush (not shown) which could be located just beyond the discharge point 74.

While I have shown and described in considerable detail what I believe to be the preferred form of my invention, it will be understood by those skilled in the art that various changes may be made in the shape and arrangement of the several parts without departing from the broad scope of the invention as defined by the following claims.

I claim:

1. A conveyor for transporting delicate articles which must be prevented from rolling around or bumping against one another, comprising:
    an endless chain consisting of a plurality of links arranged end-to-end and joined together to provide flexibility in one plane, and relative rigidity in another plane normal to said one plane;
    each of said links having an open, box-like configuration, said links being formed of elongated, thin members which are joined together to define the edges of said box-like configuration;
    certain of said members on the top side of said link being shaped to conform generally to one of said articles, whereby said one article is supported solely by said certain members at a plurality of points of contact, and is prevented thereby from rolling around or bumping against other articles carried by said conveyor;
    others of said members at adjacent ends of adjoining links being joined together by hinge barrels, whereby said adjoining links are free to swing with respect to one another about the pivot axis of said hinge barrels, said adjoining links being relatively rigid with respect to one another in the plane of said pivot axis; and
    means for driving said chain.

2. A conveyor system for collecting eggs from a row of laying cages, each of which has an inclined bottom sloping downwardly toward one side of the row, and a discharge opening at the lower end of said cage bottom through which an egg rolls by gravity when released, said system comprising:
    a conveyor chain arranged to pass across the lower end of said inclined cage bottom immediately below and closely adjacent said lower end to receive eggs rolling down said cage bottom;
    said conveyor chain consisting of a plurality of rectangular links disposed end-to-end and joined together along one side by vertical hinges;
    each of said links having a pair of laterally spaced, longitudinally extending members on its top side which are shaped to conform generally to the configuration of an egg carried thereon, and which makes substantially line-contact therewith;
    a plurality of supporting brackets mounted on said cages at spaced intervals along said rows, said brackets extending under and engaging said conveyor chain to provide support therefor;
    driving means engaging said conveyor chain to cause the same to move along the length of said row; and
    means for removing said eggs from said conveyor chain.

3. A conveyor system for collecting eggs from a row of laying cages, each of which has an inclined bottom sloping downwardly toward one side of the row, and a discharge opening at the lower end of said cage bottom through which an egg rolls by gravity when released, said system comprising:
    a conveyor chain arranged to pass across the lower end of said inclined cage bottom immediately below and closely adjacent said lower end to receive eggs rolling down said cage bottom;
    said conveyor chain consisting of a plurality of open links disposed end-to-end;
    each of said links having at least two vertical members at opposite ends thereof, and at least two laterally spaced, longitudinally extending members at the top side thereof;
    said longitudinally extending members being bent outwardly at their midportions to conform generally to the configuration of an egg carried thereon, and making substantially line-contact with said egg;
    hinge means connecting the vertical members of one link to the adjacent vertical members of the next adjoining links, and said hinge means providing for free swinging movement of said links with respect to one another in the horizontal plane while resisting relative movement between the links in the vertical plane;
    means supporting said conveyor chain at intervals along said rows; and
    driving means engaging said conveyor chain to cause the same to move along the length of said row.

4. A conveyor system for collecting eggs from a row of laying cages, each of which has an inclined bottom sloping downwardly toward one side of the row, and a discharge opening at the lower end of said cage bottom through which an egg rolls by gravity when released, said system comprising:
    a conveyor chain arranged to pass across the lower end of said inclined cage bottom immediately below and closely adjacent said lower end to receive eggs rolling down said cage bottom;
    said conveyor chain consisting of a plurality of links disposed end-to-end;
    each of said links being formed of welded wire and having two longitudinally spaced end wires, each of which is bent into the form of an inverted U;
    each of the sides of said link being formed by horizontal bottom, middle and top wires, said top wires being bent outwardly at their midportions, to conform generally to the configuration of an egg lying thereon;
    said end wires of each link being disposed parallel and closely adjacent the end wires of the next adjoining links;
    hinge barrels encircling adjacent end wires of adjoining links along one side thereof, said hinge barrels being disposed between said bottom and middle wires;
    means supporting said conveyor chain at intervals along said row; and
    driving means engaging said links between said bottom and middle wires to drive said conveyor chain along the length of said row.

5. A conveyor system for collecting eggs from a row of laying cages, each of which has an inclined bottom sloping downwardly toward one side of the row, said cage bottom being formed of welded wire and having wires extending parallel to the longitudinal axis of said row, and other wires extending transverse to said axis, said system comprising:
    a conveyor chain arranged to pass across the lower end of said inclined cage bottom immediately below and adjacent said lower end, so as to receive eggs rolling down said cage bottom;
    said conveyor chain consisting of a plurality of links hinged together for relative swinging movement in the horizontal plane, while resisting relative movement in the vertical plane;
    said links being shaped to cradle and securely hold an egg lying thereon;
    a plurality of brackets supporting said conveyor chain at spaced intervals along the length of said row;
    each of said brackets having a tang extending parallel to said cage bottom, said tang being woven through said longitudinal wires of said cage bottom, whereby said bracket is supported solely by the cage bottom;

means on said bracket engaging the underside of said conveyor chain to support the same; and means for driving said conveyor chain.

6. A conveyor system for collecting eggs from a row of laying cages, each of which has an inclined bottom sloping dowwnardly toward one side of the row, said cage bottom being formed of welded wire, and having wires extending parallel to the longitudinal axis of said row, and other wires extending transverse to said axis, said system comprising:

a conveyor chain arranged to pass across the lower end of said inclined cage bottom immediately below and adjacent said lower end, so as to receive eggs rolling down said cage bottom;

said conveyor chain consisting of a plurality of links hinged together for relative swinging movement in the horizontal plane, while resisting relative movement in the vertical plane;

said links being shaped to cradle and securely hold an egg lying thereon;

a plurality of brackets supporting said conveyor chain at spaced intervals along the length of said row;

means for attaching each of said brackets directly to one of said cages, whereby said bracket is supported solely by said cage;

said bracket including a strap portion extending upwardly from the top side of said conveyor chain on the side opposite said cages;

a strip of welded wire attached to said upwardly extending strap portion, and forming a backstop fence on the side of the conveyor chain opposite said cages, whereby an egg rolling down onto said conveyor chain is prevented from continuing beyond the chain; and means on said bracket engaging the underside of said conveyor chain to support the same.

7. A conveyor system for collecting eggs from a row of laying cages, each of which has an inclined bottom sloping downwardly toward one side of the row, said cage bottom being formed of welded wire and having wires extending parallel to the longitudinal axis of said row, and other wires extending transverse to said axis, said system comprising:

a conveyor chain arranged to pass across the lower end of said inclined cage bottom immediately below and adjacent said lower end, so as to receive eggs rolling down said cage bottom;

said conveyor chain consisting of a plurality of links hinged together for relative swinging movement in the horizontal plane, while resisting movement in the vertical plane;

said links being shaped to cradle and securely hold an egg lying therein;

a plurality of brackets supporting said conveyor chain at spaced intervals along the length of said row;

each of said brackets including a generally U-shaped metal strap having a laterally projecting tang on one side and a vertically projecting extension on the other side;

said tang extending parallel to said cage bottom and being woven through said longitudinal wires therein, whereby said bracket is supported solely by the cage bottom;

a strip of welded wire attached to said vertically projecting extension of said strap and forming a backstop fence on the side of said conveyor chain opposite said cages, whereby an egg rolling down onto said conveyor chain is prevented from continuing beyond the chain; and a roller journaled between the sides of said U-shaped metal strap, said roller engaging the underside of said conveyor chain to support the same.

8. A conveyor system for collecting eggs from a row of laying cages, each of which has an inclined bottom sloping downwardly toward one side of the row, said cage bottom being formed of welded wire and having wires extending parallel to the longitudinal axis of said row, and other wires extending transverse to said axis, said system comprising:

a conveyor chain arranged to pass across the lower end of said inclined cage bottom immediately below and adjacent said lower end, so as to receive eggs rolling down said cage bottom;

said conveyor chain consisting of a plurality of links hinged together for relative swinging movement in the horizontal plane, while resisting relative movement in the vertical plane;

each of said links having at least two vertical members at opposite ends thereof, and at least two laterally spaced, longitudinally extending members at the top side thereof;

said longitudinally extending members being bent outwardly at their midportions to conform generally to the configuration of an egg carried thereon, and making substantially line-contact with said eggs;

hinge means connecting the vertical members of one link to the adjacent vertical members of the next adjoining links, said hinge means providing for free swinging movement of said links with respect to one another in the horizontal plane, while resisting relative movement between links in the vertical plane;

a plurality of brackets supporting said conveyor chain at spaced intervals along the length of said row;

each of said brackets including a generally U-shaped metal strap having a laterally projecting tang on one side and a vertically projecting extension on the other side;

said tang extending parallel to said cage bottom and being woven through said longitudinal wires therein, whereby said bracket is supported solely by the cage bottom;

a strip of welded wire attached to said vertically projecting extension of said strap and forming a backstop fence on the side of said conveyor chain opposite said cages, whereby an egg rolling down onto said conveyor chain is prevented from continuing beyond the chain; and a roller journaled between the sides of said U-shaped metal strap, said roller engaging the underside of said conveyor chain to support the same.

9. A conveyor system as described in claim 8, wherein said laying cages are arranged in two rows, back-to-back, said cage bottoms sloping downwardly toward the outside of said double row on both sides thereof, and said conveyor chain passing down one side of said double row of cages and returning along the other side thereof;

sprocket wheels at opposite ends of said double row of cages for bringing said conveyor chain from one side of said double row to the other side thereof;

means for driving said conveyor chain;

a common collecting station at one end of said double row of cages; and means for removing eggs from said conveyor chain on to said common collecting station as said conveyor chain moves past said collecting station.

10. A conveyor system for collecting eggs from a row of laying cages, each of which has an inclined bottom sloping downwardly toward one side of the row, and a discharge opening at the lower end of said cage bottom through which an egg rolls by gravity when released, said system comprising:

a conveyor chain arranged to pass across the lower end of said inclined cage bottom immediately below and closely adjacent said lower end to receive eggs rolling down said cage bottom;

said conveyor chain consisting of a plurality of links joined together end-to-end;

each of said links including a horizontal top portion having means defining an opening shaped to conform generally to the configuration of an egg seated therein, the edges of said opening engaging said egg at a plurality of points, whereby the egg is prevented from rolling around or bumping against other eggs carried by the conveyor;

a first vertical portion bent downwardly from said horizontal top portion along the edge adjacent the lower end of said inclined cage bottom;

a second vertical portion bent downwardly from said horizontal top portion along the edge opposite said first portion;

vertical hinges connecting said first vertical portion of each link to said first vertical portion of the adjoining links at each end thereof, whereby said links are free to swing horizontally with respect to one another but are relatively rigid with respect to one another in the vertical plane passing through the axes of the hinges;

means supporting said conveyor chain at intervals along its length; and means for driving said chain.

11. A conveyor system as defined in claim 10, wherein said means supporting said conveyor chain at intervals along its length comprises a plurality of brackets mounted on said cage bottom and projecting laterally therefrom under said conveyor chain; and a roller rotatably supported on each of said brackets, said rollers engaging the bottoms of said conveyor chain links to provide rolling support therefor.

References Cited by the Examiner

UNITED STATES PATENTS 3,111,215 11/1963 Tellefson _____ 198—131
3,157,271 11/1964 Peterson _____ 198—131

EVON C. BLUNK, *Primary Examiner.*

EDWARD A. SROKA, *Examiner.*